(12) United States Patent
Rego et al.

(10) Patent No.: US 10,108,028 B2
(45) Date of Patent: Oct. 23, 2018

(54) METHOD FOR DETERMINING A GEOMETRIC DEFINITION OF A CUSTOMIZED OPTICAL DEVICE

(71) Applicant: Essilor International, Charenton-le-Pont (FR)

(72) Inventors: Carlos Rego, Charenton-le-Pont (FR); Bruno Amir, Charenton-le-Pont (FR); Guillaume Broutin, Charenton-le-Pont (FR); Maxime Boiffier, Charenton-le-Pont (FR); Thierry Bonnin, Charenton-le-Pont (FR); Melanie Tessiere, Charenton-le-Pont (FR); Jerome Moine, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 13 days.

(21) Appl. No.: 15/109,549

(22) PCT Filed: Dec. 22, 2014

(86) PCT No.: PCT/FR2014/053502
§ 371 (c)(1),
(2) Date: Jul. 1, 2016

(87) PCT Pub. No.: WO2015/101736
PCT Pub. Date: Jul. 9, 2015

(65) Prior Publication Data
US 2016/0327815 A1 Nov. 10, 2016

(30) Foreign Application Priority Data
Jan. 2, 2014 (FR) .................................. 14 50019

(51) Int. Cl.
*G02C 13/00* (2006.01)
*G06F 17/30* (2006.01)

(52) U.S. Cl.
CPC ......... *G02C 13/005* (2013.01); *G02C 13/003* (2013.01); *G06F 17/30424* (2013.01)

(58) Field of Classification Search
CPC .................. G02C 13/005; G06F 17/30424
USPC .................................................. 351/204, 246
See application file for complete search history.

(56) References Cited

U.S. PATENT DOCUMENTS

| 4,762,407 A | 8/1988 | Anger et al. |
| 5,121,548 A | 6/1992 | Daboudet et al. |
| 2003/0123026 A1 | 7/2003 | Abitbol et al. |

FOREIGN PATENT DOCUMENTS

EP 1011006 6/2000

OTHER PUBLICATIONS

Caroline Kovarki; "L'opticien lunetier"; Lavoisier TEC & DOC series; 2009; ISBN 978-2-7430-1088-1; 2nd edition, Chapter 33; pp. 1473 and beyond.

*Primary Examiner* — Jack Dinh
(74) *Attorney, Agent, or Firm* — Oblon, McClelland, Maier & Neustadt, L.L.P.

(57) ABSTRACT

The disclosed embodiments include a method for determining a geometric definition of a piece of personalized optical equipment adapted to its wearer, comprising at least one geometric definition of a personalized frame of this piece of personalized equipment. In one embodiment, the geometric definition of said personalized frame is determined depending on at least one geometric parameter of personalization of the frame and on a reference frame chosen by the wearer. Further, the value of said at least one geometric parameter of personalization of the frame being determined on the basis of the acquisition of data relating to at least one morphological quantity of the head of the wearer, in such a way that the personalized frame is adjusted to conform with a least one criterion of adjustment of personalization of the geometry of the frame with respect to the morphological quantity of the head of the wearer.

16 Claims, 4 Drawing Sheets

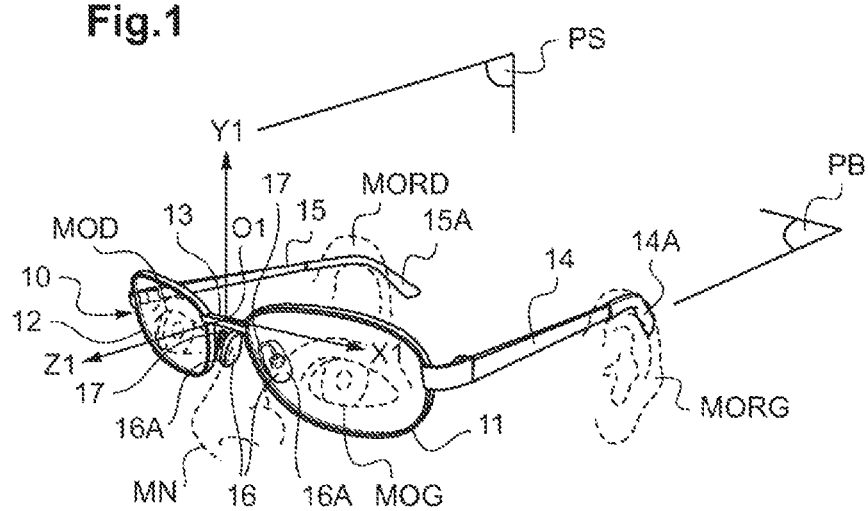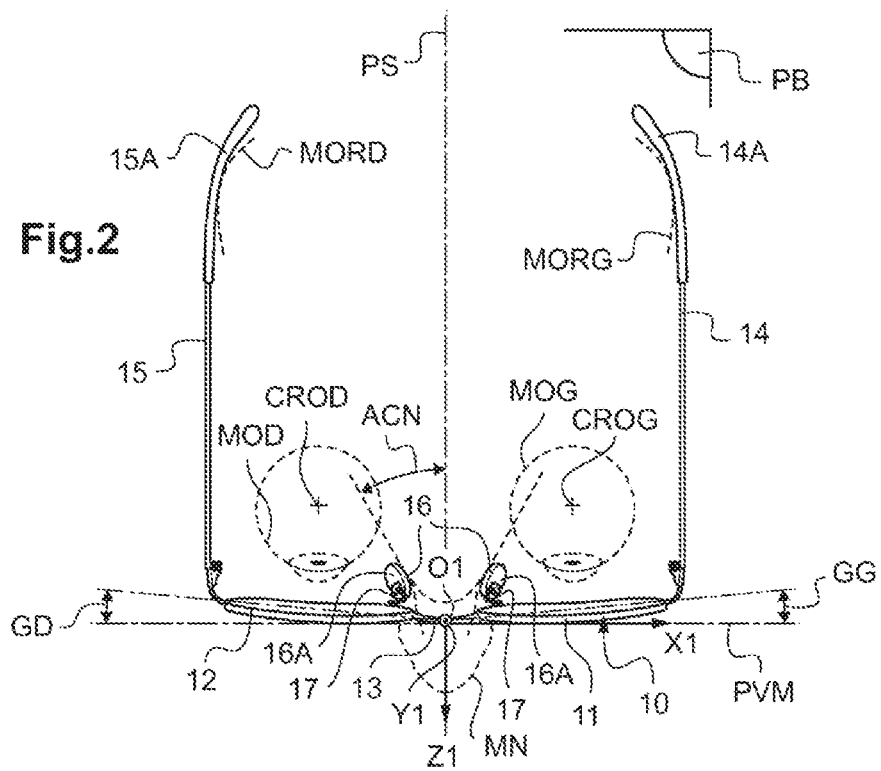

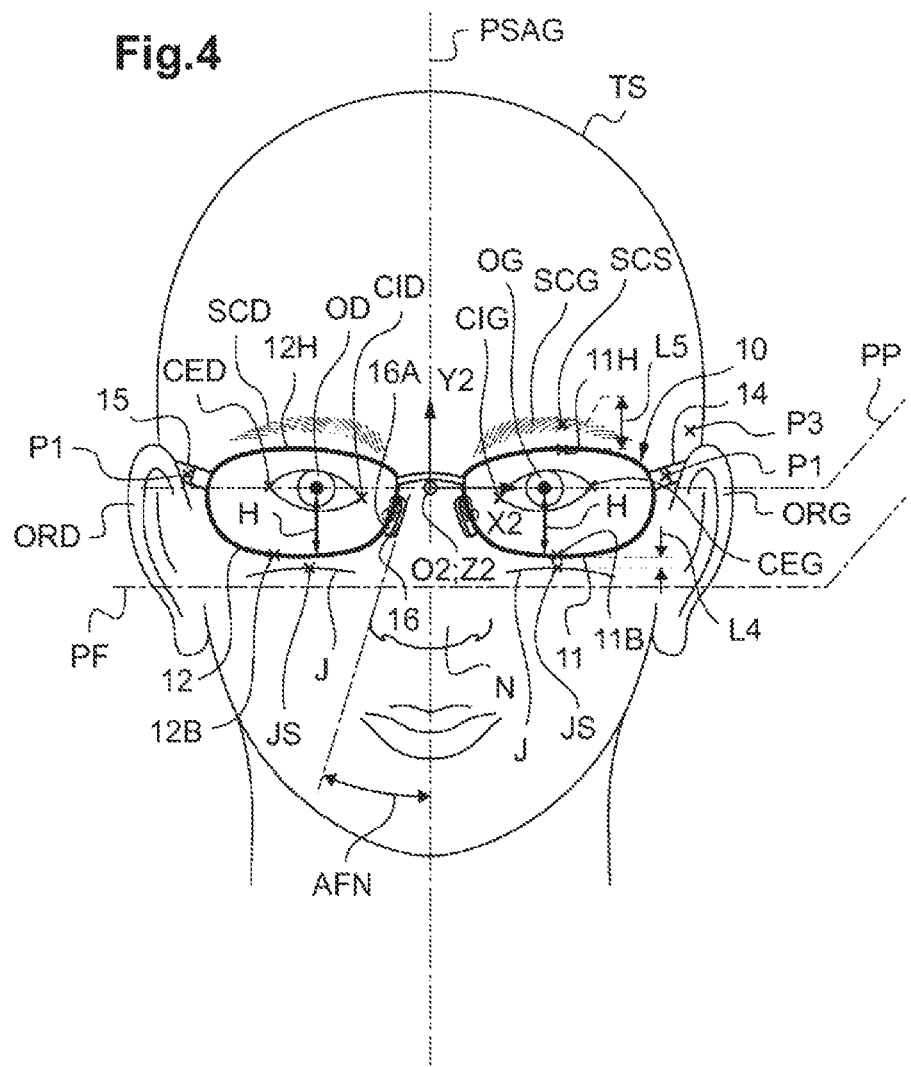

Figure 3:
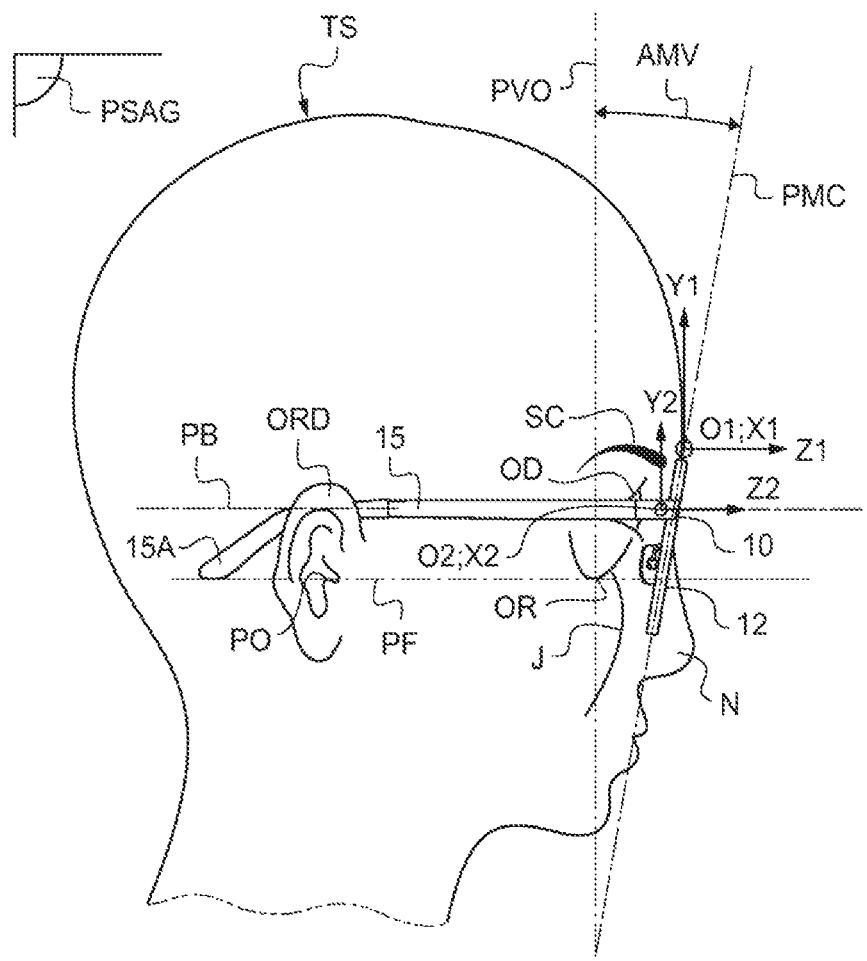

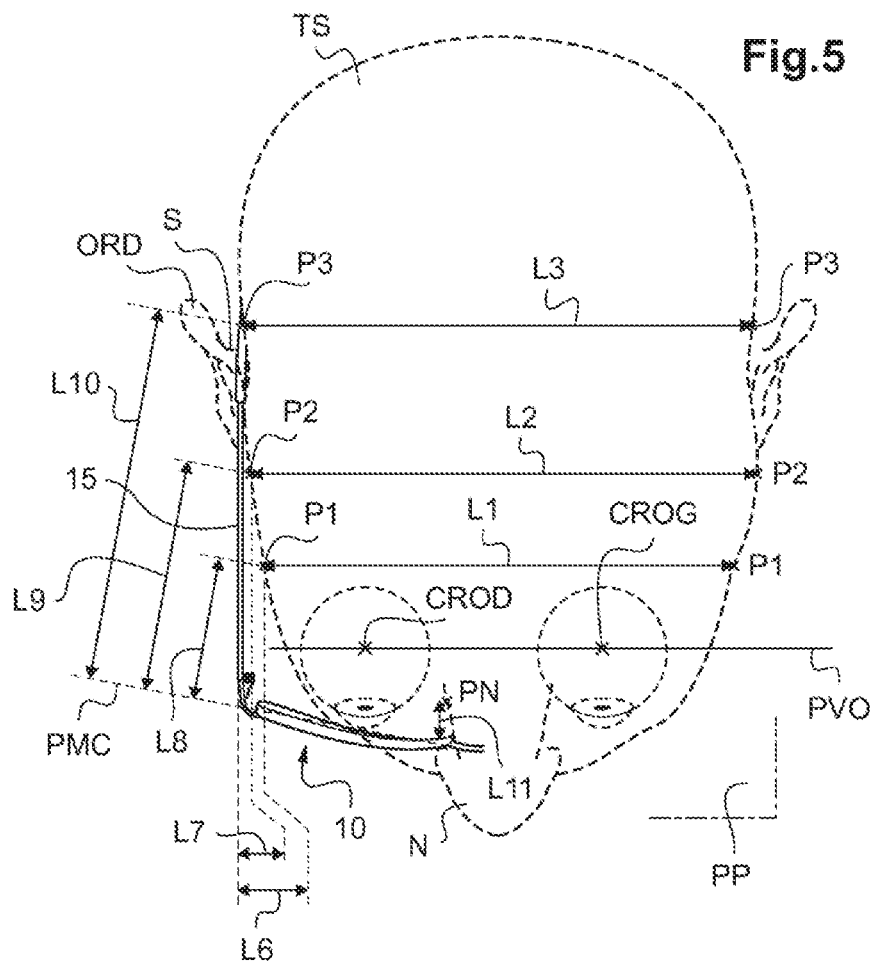
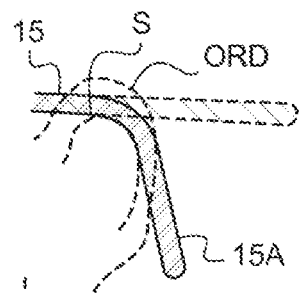
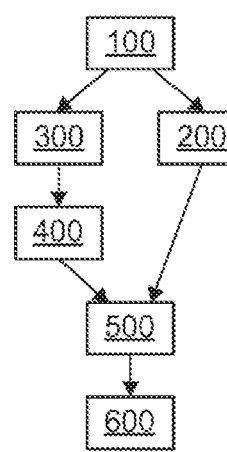

METHOD FOR DETERMINING A GEOMETRIC DEFINITION OF A CUSTOMIZED OPTICAL DEVICE

TECHNICAL FIELD TO WHICH THE INVENTION RELATES

Generally, the present invention relates to the field of the personalization of ophthalmic lenses.

It more particularly relates to a method for determining a geometric definition of a piece of personalized optical equipment adapted to its wearer.

TECHNOLOGICAL BACKGROUND

A piece of optical equipment comprises a spectacle frame and a pair of ophthalmic lenses mounted in this frame.

Current pieces of optical equipment are not defined in a personalized way.

The wearer and his optician choose from a limited set of specimen frames that which is most suitable, depending on the aesthetic desires of the wearer, on practical considerations (sporting activities, etc.) and economic considerations (price), on the optical function to be provided by the futures spectacles (need for visual correction and/or protection of the light filtering type) and on the shape of the face of the wearer (height of the rims, frame temple length, face form angle, shape of the rims, etc.). The ophthalmic lenses are also determined according to a plurality of criteria including the visual correction, the need for protection of the light filtering type, the activities carried out by the wearer with the piece of optical equipment, etc. It is thus difficult for the wearer to find a piece of optical equipment that meets all of his needs.

To attempt to partially mitigate this problem, the optician performs an adjustment of the frame directly on the face of the wearer, manually, depending on indications of comfort that the wearer provides him with and know-how gained from experience.

This adjustment is long and tedious for the optician and the wearer, and its quality, which is important for the visual correction, depends on the operator and the care taken performing this operation.

It is often carried out on reception of the finished pair of spectacles, i.e. in which the ophthalmic lenses have been mounted.

At this stage, there is also a risk that it will be realized that the optical equipment obtained is not suitably adapted to the future wearer.

Therefore, this process does not always allow a piece of optical equipment the optical and mechanical characteristics of which are precisely adapted to the wearer to be produced.

There is therefore a need to supply a piece of personalized optical equipment adapted to its wearer, at least one personalized frame of which meets a geometric definition conceived from geometrico-morphological data, i.e. data dependent both on the geometry of the frame and the morphology of the wearer.

There is furthermore a need to ensure that the piece of personalized optical equipment is realizable and a need to evaluate the quality and correctness of the suitableness of the piece of equipment for its wearer, preferably in advance.

In addition, the determination of a personalized piece of equipment is complex, because it depends on many parameters, especially on the frame chosen by the wearer (type of frame—full-rimmed, drilled, grooved—geometry of the frame, material of the frame, mechanical properties of the frame, etc.) and parameters related to the wearer refraction, morphology of the face, etc.

It is not easy to determine all of these parameters and it moreover proves to be difficult to obtain usefully exploitable results without the implementation of this determination becoming too tedious and resource intensive, especially as regards the measurement protocol and the processing of data.

SUBJECT OF THE INVENTION

In order to remedy the aforementioned drawbacks of the prior art, the present invention proposes a method for determining a geometric definition of a piece of personalized optical equipment especially making it possible to accommodate the desired ophthalmic lenses and to provide the wearer with an optimal comfort, while meeting the aesthetic criteria desired by the wearer.

More particularly, according to the invention, a method is proposed for determining a geometric definition of a piece of personalized optical equipment adapted to its wearer, comprising at least one geometric definition of a personalized frame of this piece of personalized equipment, wherein the geometric definition of said personalized frame is determined depending on at least one geometric parameter of personalization of the frame and on a reference frame chosen by the wearer, the value of said at least one geometric parameter of personalization of the frame being determined on the basis of the acquisition of data relating to at least one morphological quantity of the head of the wearer, in such a way that the personalized frame is adjusted, on the head of the wearer, to conform with at least one criterion of adjustment of personalization of the geometry of the frame with respect to the morphological quantity of the head of the wearer.

By virtue of the method according to the invention, it is possible to take into account the choices of the wearer in terms of type of frame chosen (shape, material, full-rimmed or grilled or grooved frame, etc.) and parameters related to the head of the wearer (size of the face, morphology of the face, etc.).

In particular, by morphological quantity what is meant is all the dimensions, distances or angles associated with the head of the wearer and the shapes of particular elements of the head of the wearer and their relative arrangement relative to one another.

This method thus allows wearer comfort to be improved: the zones of the head of the wearer that support the frame are mainly the top of the nose and the zone extending from the temples over the ears. The method allows elements of the frame, such as the bridge, nose-rest elements, or frame temples, to be defined from geometric data derived from the face of the wearer.

More particularly regarding the frame temples, their spacing and their length will possibly be chosen to offer an optimal fit (not too tightly or too loosely holding the piece of optical equipment).

This method thus makes it possible to improve the aesthetics: the shape of the rims (or of the lenses in the case of a pierced or grooved piece of equipment), their size, or their positioning are defined by the method from geometric data derived from the face of the wearer.

For example, in the case of a personalized frame made of plastic, the bridge and the nose-rest elements will have a shape specifically dimensioned for the wearer.

The method according to the invention also allows the shape of the personalized frame to be adapted to the nose, to the eyebrows and to the roundness of the face: it is for example possible to modify the shape of the frame near the nasal region to allow the nose to pass and/or to accentuate or soften certain curves of the personalized frame to follow the roundness of the eyebrow or the oval shape of the face, or in contrast to diverge therefrom so as to underline or reinforce features of the face of the wearer.

The method enables substantial personalization because it leaves the wearer or optician free to choose to alter a set of geometric parameters of the frame depending on aesthetic criteria desired by the wearer, these criteria possibly especially resulting from a fashion or a physical activity of the wearer.

The method lastly allows personalized optical equipment models to be generated, possibly allowing fit to be checked remotely via the Internet or virtually at an opticians.

Further nonlimiting and advantageous features of the method according to the invention are as follows:

- the geometric definition of said piece of personalized optical equipment furthermore includes a geometric definition of personalized ophthalmic lenses intended to be mounted in said personalized frame, the geometric definition of the ophthalmic lenses being determined conjointly to the geometric definition of the personalized frame;
- the frame being intended to accommodate visual correction lenses, the value of said geometric parameter of personalization of the personalized frame is determined depending on the visual correction realized by the lenses;
- said criterion of adjustment of personalization comprises a constraint on at least one of the following geometrico-morphological parameters related to the relative position of said personalized frame with respect to the head of the wearer
  - a relative position of the frame temples of the personalized frame with respect to the ears of the wearer,
  - a spacing of the frame temples of the personalized frame, said spacing being defined depending on a determined separation between the ears,
  - an evaluation of the area of contact between the nose-rest elements of the personalized frame and the nose of the wearer,
  - a relative position of the rims of the personalized frame and the eyes of the wearer,
  - a relative position of the lenses mounted in the personalized frame and the eyes of the wearer,
  - a distance between at least one singular point of the rims of the personalized frame and at least one singular point of the head of the wearer,
  - a distance between at least one singular point of the lenses mounted in the personalized frame and at least one singular point of the head of the wearer, in particular, according to one specific embodiment, a distance between at least one singular point of the outline of the lenses mounted in the personalized frame and at least one singular point of the head of the wearer.
  - a geometry of the outline, which geometry is defined depending on an eyebrow, superciliary-arch or cheekbone geometry of the wearer,
  - an angle between a straight line connecting the salient points of the cheekbone and of the superciliary arch and a mean plane of the rim of the personalized frame placed facing, measured in a plane perpendicular to said mean plane of the rim of the frame,
  - an angle between a straight line connecting a sphenoid point and a point of the side of the nose of the wearer and the mean plane of the corresponding rim of the frame, measured in a plane parallel to a Frankfurt plane of the head of the wearer;
- when said criterion of adjustment of personalization comprises a constraint on a distance between a singular point of the head of the wearer and at least one singular point of the rims of the personalized frame or at least one singular point of the lenses mounted in the personalized frame or at least one singular point of the outline of the lenses mounted in the personalized frame, the criterion of adjustment of personalization is determined in such way that this distance is larger than a minimum distance value, or so as to minimize a deviation between this distance and a target distance value;
- the frame being intended to accommodate visual correction lenses, the value of said geometric parameter of personalization of the personalized frame is determined depending on the visual correction realized by the lenses;
- the criterion of adjustment of personalization is determined depending on the visual correction realized by the lenses;
- the geometric parameter of personalization includes at least one of the following frame geometric parameters: the face-form angle, the pantoscopic angle, the length of the frame temples, the width of the bridge, the shape or one of the dimensions of the frame, the positioning or orientation of elements of the frame resting on the nose of the wearer.
- it includes the following steps:
- a1) determining a model of a reference frame, with, in the same frame of reference, at least one model of the nose-rest elements of the frame, one model of the rims of the frame or of the outline of the ophthalmic lenses mounted in the frame and one model of a portion of the frame temples of the reference frame,
- b1) determining an at least partial model of the head of the wearer, with, in the same frame of reference, at least one model of a portion of the nose, one model of a portion of the ears and at least one model of a portion of the median zone of the face comprising the eyebrows, the cheeks and the temples,
- c1) simulating the positioning of the reference frame on the head of the wearer, by superposing, on the model of the head of the wearer, the corresponding zones of the model of said reference frame,
- d1) in the configuration of step c1), determining the value of at least one reference geometrico-morphological parameter related to the relative position of said reference frame with respect to the head of the wearer;
- e1) determining, depending on the value of the reference geometrico-morphological parameter determined in step d1), the value of the geometric parameter of personalization of the piece of personalized equipment.
- it includes the following steps:
- a2) identifying a reference frame,
- b2) determining the value of at least one reference geometric parameter on said reference frame,
- c2) placing said reference frame in its position of use on the head of the wearer,
- d2) in the configuration of step c2), determining the value of at least one geometrico-morphological parameter related to the relative position of said reference frame with respect to the head of the wearer, e2) determining the value of the geometric parameter of personalization, from the value of the geometrico-morphological parameter measured in step d2) and the value of the reference geometric parameter of said reference frame;

the measurement of the geometrico-morphological parameter of step d2) includes the capture of at least one image of the head of the wearer equipped with the reference frame;

the geometric definition of said personalized frame includes accessing a register of frames containing, associated with each frame, an identifier of the shape of the frame and at least one geometric parameter of this frame and searching in this register for at least one frame the shape of which corresponds to the shape of frame chosen by the wearer and the geometry of which satisfies, with a predefined margin of tolerance, the geometric parameter of personalization of said personalized frame;

to determine the geometric definition of said personalized frame:

a geometric definition of an initial frame is deformed so that the geometric definition of the personalized frame resulting from this deformation conforms with said geometric parameter of personalization, with an adjustment on the head of the wearer in conformity with said criterion of adjustment of personalization;

the initial frame is a different shape from that of the reference frame;

the initial frame is the same as the reference frame;

the deformation of the initial frame required for the geometric definition of the personalized frame to conform with said geometric parameter of personalization is determined and information is returned on the compatibility between the ability of the initial frame to be deformed and the deformation required thereby;

the initial frame is deformed without constraint on preservation of at least one of the following dimensions of the initial frame: the perimeter of the rims, the length of the frame temples, the length of the nose bridge of the initial frame, the initial frame outline curvature;

after the geometric definition of said piece of personalized equipment has been defined this geometric definition is transmitted to the wearer for validation thereby;

after the geometric definition of said piece of personalized equipment has been determined, a geometrico-morphological parameter related to the relative position of said piece of personalized equipment with respect to the head of the wearer is deduced therefrom and information is returned on whether said piece of personalized equipment obtained by this geometric definition is in conformity with the criterion of adjustment of personalization;

information is returned on the feasibility of the manufacture of the personalized frame or said piece of personalized equipment after the geometric definition of the personalized ophthalmic lenses has been determined, information is returned on the feasibility of the manufacture of these personalized ophthalmic lenses;

the determination of the geometric definition of the piece of personalized equipment includes assembling geometric definitions of portions of the frame such as the frame temples, nose-rest elements and rims, each of these portions respectively being selected by a search, in a register containing various production dimensions and/or shapes of the portion in question, for at least one shape and/or dimension of this portion corresponding to the shape of frame chosen by the wearer and the geometry of which satisfies, with a predefined margin of tolerance, the geometric parameter of personalization;

on the basis of said geometric definition, the piece of personalized equipment is produced at least partially by additive rapid prototyping or by machining;

the data relating to at least one morphological quantity of the head of the wearer is acquired at a first site and the value of said at least one geometric parameter of personalization of the frame is determined at a second site distinct from the first;

the first site is located in any place accessible either physically by the wearer, or on a server, whereas the second site is located at an opticians, an optical laboratory, or an online supplier of optical equipment;

the determination of the definition of the personalized frame and/or the manufacture of the personalized frame takes place at a third site, distinct from the first site, which is either distinct from or the same as the second site;

provision is made to transmit data relating to at least said morphological quantity of the head of the wearer and an identifier of the reference frame from the first site to the second site, to transmit the value of said at least one geometric parameter of personalization of the personalized frame from the second site to the third site and to return, from the third site, the definition of the personalized frame and/or of the personalized frame, from the third site to the first.

DETAILED DESCRIPTION OF ONE EXEMPLARY EMBODIMENT

The description which follows with regard to the appended drawings given by way of nonlimiting examples will clearly elucidate the essence of the invention and the manner in which it may be carried out.

In the appended drawings:

FIG. 1 is a schematic perspective view of a reference spectacle frame (solid lines) and a partial model of the head of the wearer (dashed lines), FIG. 2 is a schematic top view of the reference spectacle frame and the partial model of the head of the wearer of FIG. 1, FIG. 3 is a schematic profile view of the head of the wearer with the reference spectacle frame, FIG. 4 is a schematic front view of the head of the wearer and of the reference spectacle frame of FIG. 3, FIGS. 5 and 6 illustrate a correct adjustment of a frame temple of the reference spectacle frame on the ear of the wearer, FIG. 7 is a schematic view of various steps of one embodiment of the method according to the invention.

The following definitions of terms are applicable in the rest of the description:

By "piece of optical equipment" what is meant is a piece of equipment comprising a spectacle frame and at least one ophthalmic lens intended to be mounted or fitted in this frame.

By "geometric definition" of an element, what is meant is a real or virtual geometric definition of this element. A real geometric definition of the element may be the element itself or a real model of this element, for example produced in the form of a prototype comprising only certain portions of this element. A virtual geometric definition of the element consists in a digital model of this element for example including a data file containing the values of various geometric characteristic of this element. The virtual geometric definition of the element may also comprise any data file containing the coordinates in the same frame of reference of various singular points of the element.

This element may be a piece of personalized equipment, a personalized frame and/or a generic frame and/or a generic or personalized ophthalmic lens.

When the element is a frame, the various geometric characteristics of this element are for example the face-form angle, the pantoscopic angle, the length of the frame temples, the width of the bridge, the height of the nose-rest elements, the shape of the frame or one of the dimensions of the frame, the positioning or orientation of elements of the frame resting on a nose of a wearer.

By "geometry of the frame", what is meant is the dimensions of this frame, for example the diameter of the rims and/or their shape, the length of the frame temples or the length of the bridge, and the characteristic angles of this reference frame, especially the face-form angle GD, GG and the pantoscopic angle AMV (FIGS. 2 and 3).

By "shape of frame", what is meant is a category of frame having a common geometric characteristic determining at least partially the overall shape and therefore the structure of the frame. The shape of the frame may then be associated with an identifier of this frame.

Shapes of frames may for example be classed in the following categories of frames:

categories related to the shape of each rim of the frame, for example, rims that are circular, oval, rectangular or square or another shape, categories related to the overall shapes of the rims of the frame, for example related to the base curve of the frame, which may be low, high or average depending on predefined threshold values, categories related to the shape of the frame temples of the frame: straight or curved at their free end.

The invention relates to a method for determining a geometric definition of a piece of personalized optical equipment adapted to its wearer, comprising at least one geometric definition of a personalized frame of this piece of personalized equipment, wherein:

a reference frame chosen by the wearer is identified, the value of at least one geometric parameter of personalization of the frame is determined on the basis of the acquisition of data relating to at least one morphological quantity of the head of the wearer, in such a way that the personalized frame is adjusted to conform with at least one criterion of adjustment of personalization of the geometry of the frame with respect to the morphological quantity of the head of the wearer, the geometric definition of said personalized frame is determined depending on said at least one geometric parameter of personalization of the frame and on the reference frame chosen by the wearer.

In a first variant embodiment, the method according to the invention may furthermore include a geometric definition of at least one personalized ophthalmic lens intended to be mounted in said personalized frame.

The geometric definition of the personalized ophthalmic lenses and of the personalized frame is then advantageously determined conjointly, in an overarching way.

By conjointly, what is meant is that the geometric definition of the personalized ophthalmic lenses is determined either simultaneously to the determination of the geometric definition of the frame or depending on the geometric definition of the determined personalized frame.

The geometric definition of the personalized ophthalmic lenses thus takes into account geometric and/or wearer-comfort constraints and/or aesthetic criteria desired by the wearer, as is described below.

The optical conception of these personalized ophthalmic lenses is carried out depending on optical parameters derived from the needs in terms of visual correction of the wearer, from morphological parameters dependent on the morphology of the head of the wearer and, according to the variant embodiment, if needs be, geometric parameters dependent on the geometry of the personalized frame.

In addition, since the method allows the wear conditions of the piece of personalized equipment to be defined, i.e. the positioning of this piece of equipment after adjustment on the head of the wearer, these wear conditions may also be used for the optical conception of personalized ophthalmic lenses.

In a second variant embodiment, the determination of the geometric definition of the personalized frame may take into account parameters related to the personalized ophthalmic lenses intended to be mounted in this frame, as explained below.

Determination of the Reference Frame 10 (Step 100 in FIG. 7 in Particular).

In the examples described here, a reference frame 10 is used. This reference frame 10 is standard and not personalized.

A first step of the method according to the invention therefore consists in identifying a reference frame 10. It is a question of a step in which the wearer selects the reference frame 10.

This reference frame 10 may especially be chosen by the wearer from a set of reference frames 10 that are proposed thereto. The latter may choose depending on aesthetic criteria, practical criteria (use of the frame, robustness, etc.), economic criteria (price, etc.) and/or comfort criteria.

In one variant embodiment, it is also possible to take into account criteria related to the visual correction that must be provided by the ophthalmic lenses intended to be mounted in the personalized frame. This visual correction may for example require that the rims of the frame be sufficiently large, for example for progressive lenses, or that the face-form angle of the frame not be too large, for example for lenses for correcting myopia.

FIGS. 1 to 4 show an exemplary reference spectacle frame 10 chosen by the wearer. In the illustrated example, the reference frame 10 is of full-rimmed type, i.e. the reference frame 10 includes rims 11, 12 in which the ophthalmic lenses are intended to be mounted.

These two rims 11, 12 are rigidly connected by a nose bridge 13. Each rim 11, 12 is also connected to a frame temple 14, 15 conventionally hinged to the corresponding rim.

Below the frame temples will be considered to be fixed in their open position one relative to the other.

The nose bridge 13 includes nose-rest elements. These rest elements especially comprise two surfaces 16 that rest on the sides of the nose of the wearer (FIG. 1). These rest surfaces 16 may be fixed, for example in the case of a reference frame made of plastic in which the nose-rest elements and therefore these surfaces are integrated into the rims of the frame, or be adjustable, for example in the case of a metal reference frame in which the nose-rest elements take the form of two pads 16A each connected to the nose bridge by an arm 17 (FIGS. 1 and 2). It is the latter case that is shown in the figures.

The pads 16A may also be connected to the rims 11, 12 of the frame 10.

The pads 16A bearing the surfaces 16 of the reference frame 10 that rest on the nose of the wearer mainly have two adjustable parameters: on the one hand the distance of the pad 16A from the rim 11, 12 of the frame 10 and on the other hand the inclination of the pad 16A by a frontal angle and a splay angle, which will be defined below.

In the case described above of plastic frames, the position and inclination of the rest surfaces of the frame on the nose of the wearer are predetermined and fixed.

Each frame temple 14, 15 of the reference frame 10 comprises at least one first portion the end of which is connected to the corresponding rim 11, 12. This first portion may be straight (FIG. 5) or have a slight curvature allowing it to closely follow the outline of the head TS of the wearer.

In the example shown in the figures, each frame temple 14, 15 of the reference frame 10 furthermore includes a second portion taking the form of a curl 14A, 15A extending the first portion of the frame temple 14, 15 at the end opposite the rims 11, 12 of the frame 10.

This curl 14A, 15A forms the curved end of the corresponding frame temple 14, 15. It is intended to be placed behind the corresponding ear ORD, ORG of the wearer (see FIG. 6).

As a variant, the frame temples of the reference frame 10 do not include curls. In this case, it is the free end of the first portion of the frame temple that rests on the ear of the wearer. This variant is shown dashed in FIG. 6.

As another variant, the reference frame 10 may be of drilled type, i.e. the ophthalmic lenses are drilled and each held by one end of the nose bridge and one end of the frame temple associated with the lens, which interact with drilled holes. This type of frame is similar to that described above, except that it does not include rims. The nose bridge and the frame temples are similar. In practice, for such a drilled frame, the outline of the ophthalmic lenses then plays the role of the rims of a full-rim type frame.

Generally, the reference frame 10 has a plane of symmetry PS passing through the middle of the nose bridge 13 and equidistant from the frame temples 14, 15 of the frame 10.

Furthermore, the first portion of the two frame temples 14, 15 extends in the same mean plane PB.

As shown in FIGS. 1 and 2, a first frame of reference associated with the reference frame 10, i.e. a frame of reference in which the reference frame 10 has a fixed orientation and position, is defined, this frame of reference having an orthonormal coordinate system (O1, X1, Y1, Z1). The center O1 of the coordinate system of this first frame of reference is, for example, the middle of the nose bridge 13. The axis O1Z1 is parallel to the intersection of the plane of symmetry PS of the frame 10 and of the mean plane PB of the frame temples 14, 15. The axis O1Y1 extends in the plane of symmetry PS of the reference frame 10, in the opposite direction to the rims of the frame. The axis O1X1 extends parallelly to the mean plane of the frame temples PB. The plane O1Y1Z1 thus corresponds to the plane of symmetry PS of the reference frame 10. The plane O1X1Z1 is parallel to the mean plane of the frame temples PB. The plane O1X1Y1 is called the vertical frame plane PVM.

The splay angle of each pad 16A corresponds to the inclination of the area of contact of the pad 16A with respect to the plane O1Y1Z1 of the frame 10, measured in projection in the plane O1X1Y1.

The frontal angle of each pad 16A corresponds to the inclination of the area of contact of the pad 16A with respect to the plane O1Y1Z1, measured in projection in the plane O1X1Y1.

Generally, the reference frame 10 may be a real or virtual frame.

According to a first embodiment, the reference frame 10 is virtual and the wearer may for example choose it from a catalogue or online for example. This virtual reference frame 10 is associated with a three-dimensional model or a set of measurements of characteristic angles and lengths of this reference frame 10 or even with the coordinates in the same frame of reference of a set of particular points of the reference frame 10.

The virtual reference frame 10 may also be determined by carrying out at least partial modelling of a real reference frame.

According to a second embodiment, the reference frame 10 is real. It is for example chosen in a shop by the wearer. The reference frame 10 may comprise dummy demonstration lenses or no lenses.

Determination of the Geometric Parameter of Personalization of the Frame

The reference frame 10 being identified, the next step is the determination of the geometric parameter of personalization of this frame.

The geometric parameter of personalization may be determined in various ways. Two embodiments are envisioned below, depending on whether the reference frame 10 is virtual or real.

According to a first embodiment in which the reference frame 10 is virtual, a value of said geometric parameter of personalization is determined depending on a model of the head of the wearer and a virtual adjustment of this model of the reference frame 10 to the model of the head of the wearer.

More particularly, the determination of the geometric parameter of personalization then for example includes the following steps:

a1) determining the virtual reference frame 10, this step for example comprising modelling a real reference frame 10, with, in said first frame of reference (O1, X1, Y1, Z1), at least one model of the nose-rest elements of the reference frame 10 and one model of a portion of the frame temples 14, 15 of the reference frame 10, b1) determining an at least partial model of the head TS of the wearer, with, in a given frame of reference, at least one model of a portion of the nose N, and one model of a portion of the ears ORD and ORG, c1) simulating the positioning of the reference frame 10 on the head TS of the wearer, by superposing, on the model of the head TS of the wearer, the corresponding zones of the model of said reference frame 10, d1) in the configuration of step c1), determining the value of at least one reference geometrico-morphological parameter $PGM_{ref}$ related to the relative position of said reference frame 10 with respect to the head TS of the wearer;

e1) determining, on the basis of this superposition, the value of the geometric parameter of personalization of the personalized frame.

Step a1)

It is a question in this step of collecting the data of the reference frame 10 selected in the preceding step.

This virtual reference frame 10 may for example be defined by a set of characteristic angles and lengths of the frame.

It may also comprise a model of the rims of the frame or of the outline of the ophthalmic lenses mounted in the frame 10.

These characteristic angles and lengths for example include, for the model of a portion of the frame temples: the length of the first portion of the frame temples 14, 15, the length of the curls 14A, 15A, the separation between the frame temples 14, 15, the angle between the curl 14A, 15A and the first portion of the corresponding frame temple 14, 15 in the plane O1Y1Z1 and in the plane O1X1Z1.

They for example include, for the model of the nose-rest elements: the separation between the rest surfaces 16 of the bridge 13 on the nose, the angle made between the rest surfaces 16 and the distance of these rest surfaces to the rims of the frame 10.

They for example include, for the model of the rims 11, 12: the diameter of each rim 11, 12 in the plane O1,X1,Z1, the measurement of the face-form angle GD, GG corresponding to the angle made between each rim 11, 12 and the plane O1X1Y1 or vertical frame plane PVM (FIG. 2), and the position of the highest and lowest points of the rims 11, 12 in the plane O1Y1Z1.

More specifically, for the model of the rims 11, 12 the geometric parameter of the shape may be retranscribed as a collection of points Pi of coordinates (Xi, Yi, Zi) representative of the trajectory of the groove of the corresponding rim 11, 12 or of the outline of the lens itself when it is a question of a drilled or grooved frame. These data are, for example, established by a commercially available device of shape-reader type as for example described in document U.S. Pat. No. 5,121,548.

Regarding the face-form angle, certain commercially available devices are capable of measuring this angle during the acquisition of the shape of the frame.

Another method for determining this angle is a technique of direct measurement of the reference frame 10 on a graduated chart. It consists in positioning the reference frame 10 above a standard pattern modelling various face-form-angle values. The value is obtained by direct reading when the reference frame 10 is correctly positioned.

From these characteristics of lengths and angles, it is possible to construct a model of the reference frame 10. This construction may take into account other parameters, such as the material of the frame or the thickness of the frame temples and rims.

The reference frame 10 may also be modelled by the datum of the position in the first frame of reference (O1, X1, Y1, Z1) of a certain number of particular points of the reference frame 10.

This model or virtual reference frame 10 may lastly be the result of an acquisition of a three-dimensional image of the real reference frame 10. This acquisition may for example be made using a stereoscopic image-acquiring device or using a three-dimensional scanner.

Whatever the method for obtaining the virtual reference frame 10, the latter is stored in memory in the aforementioned electronic and computational means. It is thus possible to create, in this memory, a database including the models of a set of available reference frames 10, which are determined in advance.

These steps of determining the virtual reference frame 10 are implemented by computational and electronic means programmed for this purpose.

Step b1)

The head TS of the wearer is modelled either in real-time so as to carry out a virtual check of the fit of the reference frame 10 on the head TS of the wearer, or in an optional preliminary step.

The real-time model of the head TS of the wearer is preferably displayed in real-time.

Independently of whether the head TS of the wearer is modelled in real-time or in a preliminary step, it may be done either by choosing a generic model from a database, or by determining a model specific to the head TS of the wearer.

In the determination of use of a generic model of the head TS of the wearer, the model of the head TS of the wearer is chosen from a predetermined modelling group depending on choice criteria such as sex, age, ethnic origin, or a simplified measurement such as the size of the cranial perimeter of the wearer.

It may for example be a question of a generic model adapted to a Caucasian or Asian wearer or to a child depending on his age, etc.

In the case of determination of a specific model of the head of the wearer, this step includes the following substep:
determining an at least partial digital model of the head TS of the wearer, with, in a common frame of reference, at least one model MN of a portion of the nose N, and one model MORD, MORG of a portion of the ears ORD and ORG (FIG. 1).

In one variant embodiment, the digital model furthermore comprises at least one model of a portion of the median zone of the face comprising the eyebrows SCD, SCG, the cheeks J and the temples; the latter portion may be likened to the zone illustrated in FIG. 4 and comprised between a Frankfurt plane PF defined below and the eyebrows SCD, SCG of the wearer.

As shown in FIG. 3, a second frame of reference associated with the head TS of the wearer, i.e. in which the head TS of the wearer has a fixed orientation and position, is defined, this frame of reference having an orthonormal coordinate system (O2, X2, Y2, Z2).

The Frankfurt plane PF of the head TS of the wearer is defined as the plane passing through the lower orbital points OR and the porion PO of the wearer, the porion being the highest point in the skull of the auditory canal, which corresponds to the tragion of the ear (FIG. 3).

The wearer is considered to be in an orthostatic position, in which position he makes a minimum of effort. The gaze axis of the wearer is the primary gaze axis, i.e. he gazes straight ahead. The Frankfurt plane PF is then horizontal.

A sagittal plane PSAG of the head TS of the wearer is defined as being the vertical plane passing through the bisector AO of the two eyes OG, OD. The bisector AO of the eyes is the axis passing through the middle of the segment defined by the rotation centers of the two eyes and parallel to the Frankfurt plane PF.

The pantoscopic angle AMV is defined as the angle between the mean plane PMC of each rim of the frame 10 and the vertical eye plane PVO, which is the plane perpendicular to the gaze axis in the orthostatic position.

Preferably, the vertical eye plane PVO also corresponds to the plane perpendicular to the Frankfurt plane passing through the rotation centers CROG, CROD of the eyes, measured in projection in the sagittal plane of the head TS of the wearer.

The center O2 of the coordinate system of this second frame of reference is, for example, the middle of the segment connecting the rotation centers of the eyes OD, OG of the wearer.

The axis O2Z2 is located in the sagittal plane PSAG of the head TS of the wearer and is parallel to the Frankfurt plane PF. It extends in a direction away from the head of the wearer. The axis O2Y2 extends in the sagittal plane PSAG of the head TS of the wearer and is perpendicular to the Frankfurt plane PF. The axis O2X2 extends parallelly to the Frankfurt plane PF. As a variant, any other frame of reference of the frame and/or head of the wearer may be envisioned.

The model of the head of the wearer for example comprises, in said second frame of reference (O2, X2, Y2, Z2), at least one model MN of a portion of the nose N and one model MORD, MORG of a portion of the ears ORD, ORG of the wearer.

Furthermore, preferably a model MOD, MOG of a portion of the eyes of the wearer is determined.

These models are schematically shown in FIGS. 1 and 2 by dashed lines.

The model MN of a portion of the nose for example preferably includes the width of the root of the nose N, the frontal angle AFN (FIG. 4) of the nose, the splay angle ACN of the nose (FIG. 2).

The model MORD, MORG of a portion of each ear of the wearer includes the coordinates of a curved surface corresponding to the trough S located between the auricle ORD, ORG and the skull of the wearer, behind the ear (FIGS. 5 and 6). Specifically, it is on this trough S that the corresponding frame temple 14, 15 of the spectacle frame 10 rests.

The model MOD, MOG of the eyes of the wearer for example includes the position in the second frame of reference (O2, X2, Y2, Z2) of the rotation center CROD, CROG of each eye. It may also comprise a diameter of the eye: the model of the eye then consists of a sphere of this diameter centered on the eye rotation center (FIG. 2). Preferably, a model of a portion of the cheekbones J and/or eyebrows SCD, SCG (FIGS. 3 and 4) of the head of the wearer is also determined.

This model is preferably the result of an acquisition of a three-dimensional image of the head TS of the wearer. This acquisition may for example be made using a stereoscopic image-acquiring device or using a three-dimensional scanner, for example a structured-light scanner.

Three-dimensional images of the head TS of the wearer, from in front (FIG. 4) and from the side (FIG. 3), and of the rim of the ears are preferably acquired. The acquisition preferably has an angular precision of 2 degrees and a distance precision of two millimeters.

It may be carried out by an external operator, for example by an optician in his shop. It is also possible to envision it being carried out remotely, for example by the wearer himself at home, and then transmitted to the operator responsible for determining the personalized frame.

The head TS of the wearer may also be modelled by capturing one or more two-dimensional images of the head TS of the wearer.

Whatever the 2D or 3D image-capturing device used, a piece of information indicating the scale of the captured image is recorded in correspondence with the captured images. It may be a question of the image of a scale indicator placed on the head TS of the wearer, for example an element including a pattern of known dimensions, placed on the head TS or on a spectacle frame of the wearer or of the known interpupillary distance of the wearer.

This piece of information may also be delivered by the image-capturing device or received thereby.

Lastly, the model of the head TS of the wearer may also consist of a set of measurements carried out directly by the optician on the head TS of the wearer, for example using a ruler.

Generally, the relative position of the following points of the head TS of the wearer may be determined:
 center of the pupils,
 canthus of the eye,
 sphenoid and temporal points.

The following geometric parameters of the head TS of the wearer may be determined:
 height of the eyebrows, shape of the eyebrows,
 height of the cheekbones,
 shape of the nose level with the canthi,
 lateral slope of the nose,
 mean vertical/horizontal curvature of the face, or vertical/horizontal curvature of the face on a precise meridian,
 overall shape of the head TS of the wearer, for example according to one of the existing classifications, according to Sigaud, Hoffman, or Eber,
 bearing of the head, natural inclination to the left or right.

In the case where the model of the head TS of the wearer is produced from one or more captured images, the identification of these points and the determination of these measurements or features of the face of the wearer will possibly be automated via an image-processing software package (facial recognition) or semi-automated via an interface where a certain number of points must be selected by the user, in practice the optician.

This specific model of the head TS of the wearer is also stored in memory in the computational and electronic means.

Step c1)

It is then a question of superposing by calculation the model of the reference frame 10 and the model of the head TS of the wearer.

More precisely, the following are superposed: on the one hand, the model of one portion of the bridge 13 of the reference frame 10 and the model MN of one portion of the nose N of the wearer, and on the other hand, the model of one portion of the frame temples 14, 15 of the reference frame 10 and the model MORD, MORG of one portion of the ears ORD, ORG of the wearer.

On doing this, a reference positioning of the reference frame 10 on the head TS of the wearer is realized. In this step, a rough adjustment of the reference frame 10 on the head TS of the wearer is carried out.

More particularly, it is simply checked whether the reference frame 10 is horizontal on the head TS of the wearer. In this context, the following example gives one possible method for realizing the digital superposition of two models with positioning of the reference frame 10 on the head of the wearer.

Initially, the first and second frames of reference (O1, X1, Y1, Z1) and (O2, X2, Y2, Z2), of the reference frame 10 and of the head, are considered to be coincident, then their relative positioning is optimized while maintaining the axis O1X1 parallel to the axis O2X2. The horizontality of the frame on the head of the wearer is thus ensured.

Step d1)

The positioning of step c1) is realized by calculation. From memorized data, the computational and electronic means are then programmed to determine by calculation the values of the sought reference geometrico-morphological parameters $PGM_{ref}$ from the superposition of the models of the head TS of the wearer and of the virtual reference frame 10, which superposition was determined beforehand in step c1).

Whatever the embodiment envisioned for carrying out this step d1), in practice the sought reference geometrico-morphological parameter $PGM_{ref}$ depends both on the geometry of the reference frame 10 and on the morphology of the head TS of the wearer.

By morphology of the head TS of the wearer, what is especially meant is the dimensions of the head of the wearer, the position of the eyes, cheekbones, eyebrows or nose on the head of the wearer, the shape of the eyebrows and of the nose.

The dimensions of the head TS of the wearer especially comprise measurements of the width L1, L2, L3 of the head TS measured as the distance between two points P1, P2, P3 located on either side of the head, at the intersection with a plane PP parallel to the Frankfurt plane PF and passing through the internal canthi CID, CIG or external canthi CED, CEG of the eyes (see FIG. 4).

The sphenoid points P1, temporal points P2 and superauricular points P3 of the head of the wearer are especially defined (see FIGS. 4 and 5).

The sphenoid points P1 are located on either side of the head TS of the wearer, level with the sphenoid bone of the skull. Two points located on a horizontal line, i.e. parallel to the Frankfurt plane PF and parallel to the vertical eye plane PVO are considered. The pair of sphenoid points considered will correspond, for the implementation of the method, to the pair of points separated by a minimum distance. The temporal points are located on either side of the head of the wearer, level with the temporal bone of the skull. Two points located on a horizontal line, i.e. parallel to the Frankfurt plane and parallel to the vertical eye plane PVO are considered. The pair of temporal points considered will correspond, for the implementation of the method, to the pair of points separated by a minimum distance. These sphenoid and temporal points are, for example, defined in the document having the title "*L'opticien lunetier*" by Caroline Kovarki published by Lavoisier as part of the TEC & DOC series, in 2009, ISBN 978-2-7430-1088-1, 2nd edition, Chapter 33—measurements described on pages 1473 and beyond.

The superauricular points are located on either side of the head of the wearer, in correspondence with the highest point of the trough of the ear. The upper auricular separation corresponding to the distance between these two superauricular points is the separation between the troughs S of the right and left ears ORD, ORG.

More precisely, said at least one reference geometrico-morphological parameter $PGM_{ref}$ determined in step d1) for example includes one of the following geometric quantities:
  a relative position of the frame temples of the reference frame 10 with respect to the ears ORD, ORG of the wearer,
  a spacing of the frame temples 14, 15 of the reference frame 10, said spacing being associated with a determined separation between the ears ORD, ORG,
  an evaluation of the area of contact between the nose-rest elements 16A of the reference frame 10 and the nose N of the wearer,
  a relative position of the rims 11, 12 of the reference frame 10 and the eyes OD, OG of the wearer,
  a relative position of the outline of the ophthalmic lenses mounted in the reference frame 10 and of the eyes OD, OG of the wearer,
  a distance between at least one singular point of the reference frame 10 and a singular point of the head of the wearer,
  a distance between at least one singular point of the outline of the ophthalmic lenses mounted in the reference frame 10 and a point of the head TS of the wearer,
  an angle between a straight line connecting the salient points of the cheekbone JS and of the superciliary arch SCS and the mean plane PMC of the rim of the reference frame placed facing, measured in a plane perpendicular to said mean plane of the rim of the reference frame,
  an angle between a straight line connecting the sphenoid point P1 and a point PN of the side of the nose of the wearer and the mean plane PMC of the corresponding rim of the reference frame, measured in a plane parallel to the Frankfurt plane PF of the head TS of the wearer.

In particular, said at least one reference geometrico-morphological parameter $PGM_{ref}$ of step d1) preferably includes a distance between at least one singular point of the reference frame and a singular point of the head of the wearer, from the following distances:
  distance between a point of the rims of the reference frame 10 and a point of the cheekbones of the wearer, for example the distance L4 between the lowest point 11B, 12B of the rim 11, 12 of the reference frame 10 and the most protruding point JS of the corresponding cheekbone J of the wearer, measured in projection in a plane parallel to the Frankfurt plane of the head of the wearer (FIG. 4),
  distance between a point of the rims of the reference frame 10 and a point of the eyebrows SCD, SCG of the wearer, for example the distance L5 between the highest point 11H, 12H of the rim 11, 12 of the reference frame and the most protruding point SCS of the corresponding eyebrow SCD, SCG or superciliary arch SC of the wearer measured in projection in a plane parallel to the Frankfurt plane of the head of the wearer (FIG. 4),
  distance between a point of the eyes of the wearer and a point associated with the reference frame 10, for example the distance between one of the canthi CI, CE of the eye ORD, ORG and the mean plane PMC of the corresponding rim of the reference frame,
  distance L6, L7 between each sphenoid point P1, temporal point P2 and/or superauricular point P3 and the corresponding frame temple 14, 15 of the reference frame 10 (FIG. 5),
  distance L8, L9, L10 between each sphenoid point P1, temporal point P2 and/or superauricular point P3 and the mean plane PMC of the corresponding rim of the reference frame (FIG. 5),
  distance L11 between a point PN of the side of the nose and the point closest the rim 11, 12 of the reference frame 10, the point of the side of the nose for example being a point of the side of the nose belonging to a plane parallel to the Frankfurt plane and passing through the internal or external canthi of the eyes of the wearer.

It is also possible to take into account the distances between each sphenoid point P1, temporal point P2 and/or superauricular point P3 and the vertical frame plane PVM of the reference frame 10.

In particular, said at least one reference geometrico-morphological parameter $PGM_{ref}$ of step d1) consists of a collection of distances between the points of the reference frame 10 and one or more singular points of the head TS of the wearer. The points serving in the construction of this collection of distances may be chosen by equidistant sampling over a portion or the entirety of the rims of the reference frame 10. These points are for example those derived from the shape reader. The distances forming the collection are then assessed between the point itself and its projection on the face along the axis O1Z1.

Step e1)

In step e1), at least one value of at least one geometric parameter of personalization $P_{perso}$ of said personalized frame is determined from the value of the reference geometrico-morphological parameter $PGM_{ref}$ determined in step d1).

More precisely, the value of said geometric parameter of personalization $P_{perso}$ is determined in such a way that the personalized frame is adjusted on the head of the wearer to conform with at least one criterion of adjustment of personalization comprising a constraint on at least one geometrico-morphological parameter related to the relative position of said personalized frame with respect to the head TS of the wearer.

This criterion of adjustment of personalization is predetermined.

In other words, the geometric parameter of personalization $P_{perso}$ is determined depending on the values of the reference geometrico-morphological parameter $PGM_{ref}$ determined in step d1) for the reference frame 10 positioned on the head of the wearer, so that the geometrico-morphological parameter related to the relative position of said personalized frame with respect to the head TS of the wearer satisfies a criterion of adjustment of personalization.

In one nonlimiting example, the piece of equipment is personalized via a geometric parameter of personalization $P_{perso}$ that is the face-form angle of the frame.

More exactly, two geometric parameters of personalization are defined that are the left face-form angle GG for the left side of the frame and the right face-form angle GD for the right side of the frame.

It will be noted that the determination of these parameters in particular involves taking into account the prescription of the wearer and positioning of the ophthalmic lens in front of the eye in a way compatible with the optical correction to be realized. Specifically, in the mounting step, the geometry of the ophthalmic lens, related to the requested prescription, will have an effect on the face-form angle of the personalized frame. The flatter the front face of the lens the smaller the resulting face-form angle will be, this being incompatible with an effective protection because in this case the lens will in effect diverge from the face temporal-side.

In a prior step, optical parameters of the lens, such as the curvatures of its faces, are determined. The curvature of the front face is then evaluated over a zone of the lens corresponding to the shape of the reference frame.

The criterion of adjustment of personalization used here comprises a constraint on the geometrico-morphological parameter of distance between a singular point of the rims 11 and 12 of the personalized frame and a singular point of the head TS of the wearer.

In practice, the median zone of the face is in particular modelled in step b1) then the positioning in c1) is performed.

Then, in d1) a criterion of adjustment of personalization on the geometrico-morphological parameter of distance between a singular point of the left rim 11 (of the right rim 12, respectively) of the personalized frame and a singular point of the head TS of the wearer is used. This criterion of adjustment of personalization is here the distance De between the extreme point Pe of the temporal-side shape located on the horizontal median line and the point P'e of the face. The point Pe is the point of the rim the coordinate Xe of which along O1X1 is minimal or maximal (right temporal side Xe is minimum, left temporal side Xe is maximal). The horizontal median line being the line that cuts the shape of the rims in two portions of equal height when the shape is seen from in front. P'e is determined by the projection onto the face of the point Pe along a fixed axis, for example the axis O1Z1. This distance is used by way of target distance. In a nonlimiting example, the criterion of adjustment is that this distance be equal to 15 millimeters +/−5 millimeters. The personalized frame obtained has a geometry such that the point Pe is located at a distance of 15 millimeters +/−5 millimeters from the point P'e.

The value of the geometric parameter of personalization $P_{perso}$ determined in step e1) is here the value of the personalized face-form angle GG' (GD', respectively). Specifically, when the face form of the frame is varied the distance De is modified.

This parameter is established depending on the relative distance De to the position of the point Pe including the ophthalmic lens but also on optical defects to be limited such as prismatic deviations not to be exceeded. Thus, in step e1), it is sought to satisfy as best as possible the criterion of adjustment on the distance De, i.e. to achieve as best as possible a target value, while guaranteeing a good optical function by limiting deviations.

More generally, the criterion of adjustment of personalization comprises a constraint on at least one of the following personalized geometrico-morphological parameters:

a relative position of the frame temples of the personalized frame with respect to the ears ORD, ORG of the wearer, a spacing of the frame temples of the personalized frame, said spacing being defined depending on a determined separation between the ears ORD, ORG, an optimization of the area of contact between the nose-rest elements of the personalized frame and the nose N of the wearer, a relative position of the rims of the personalized frame and the eyes OD, OG of the wearer, a relative position of the outline of the ophthalmic lenses mounted in the personalized frame and of the eyes OD, OG of the wearer, a distance between at least one singular point of the personalized frame and a singular point of the head of the wearer, a distance between at least one singular point of the outline of the ophthalmic lenses mounted in the personalized frame and a singular point of the head of the wearer, a geometry of the frame outline defined depending on a geometry of the eyebrows, superciliary arches or cheekbones of the wearer, an angle between a straight line connecting the salient points of the cheekbone JS and of the superciliary arch SCS and the mean plane PMC of the rim of the personalized frame placed facing, measured in a plane perpendicular to said mean plane of the rim of the frame, an angle between a straight line connecting the sphenoid point P1 and a point PN of the side of the nose of the wearer and the mean plane PMC of the corresponding rim of the frame, measured in a plane parallel to the Frankfurt plane PF of the head of the wearer.

The distances and the singular points considered here are for example chosen from those described for the determination of the reference geometrico-morphological parameter $PGM_{ref}$ of step d1).

When said criterion of adjustment of personalization comprises a constraint on a distance between a singular point of the head TS of the wearer and at least one singular point of the rims of the personalized frame or of the outline of the ophthalmic lenses mounted in the personalized frame, the criterion of adjustment of personalization is determined in such a way that this distance is larger than a minimum distance value, or so as to minimize a deviation between this distance and a target distance value.

This amounts to preventing any contact between the personalized frame and the head TS of the wearer outside of the zones of the frame provided for this purpose: nose-rest elements and framed temples.

The personalized criterion of adjustment may for example comprise target values for various personalized geometric parameters $P_{perso}$ depending on standard values of adjustment of the frame.

For example, a target value of the distance between the eyes and the ophthalmic lens, i.e. between the corneal apexes of the eyes and a point of the back face of the lens, is equal to 12 millimeters.

It is also possible to set a target value of the separation between the rims 11, 12 of the frame 10 and the eyebrows SCD, SCG and/or the cheekbones J of the wearer equal to 3 millimeters, for example.

It is lastly possible to set thus a target value equal to 6 degrees for the pantoscopic angle AMV or equal to 8 degrees for the value of the face-form angle GG, GD of the frame 10.

The target values may also be determined depending on the material of the personalized frame: for example, for a satisfying adjustment, it is possible to make provision for a target value of the separation between the frame temples of the personalized frame to depend on the upper auricular separation, i.e. the separation between the troughs S of the right and left ears ORD, ORG.

For flexible frame temples, for example made of metal and of small thickness, the target value of the separation between the frame temples is equal to the upper auricular separation minus fifteen millimeters.

For semi-rigid frame temples, for example made of metal and of large thickness, the target value of the separation between the frame temples is equal to the upper auricular separation minus ten millimeters.

For rigid frame temples, for example made of plastic and of small thickness, the target value of the separation between the frame temples is equal to the upper auricular separation minus five millimeters.

For very rigid frame temples, for example made of plastic and of large thickness, the target value of the separation between the frame temples is equal to the upper auricular separation minus two or three millimeters.

The target values may be replaced by intervals of target values. It may also be a question of maximum and/or minimum values.

It is also possible to take into account other empirical criteria, for example to require that the frame temple of the personalized frame make contact with the trough S of the ear ORG, ORD over a length comprised between 2 and 2.5 centimeters (FIG. 6) and that it be located at a distance comprised between 2 and 5 millimeters from the skull of the wearer. It is also possible to make provision for the shape of the curl to be adapted all the way along the length of the trough of the ear. This adjustment allows the personalized equipment to grip better, in particular for wearers having a quite flat nose and requiring a strong correction or engaging in substantial dynamic activity.

Furthermore, in one aforementioned embodiment, the personalized frame being intended to accommodate visual correction lenses, the value of said geometric parameter of personalization $P_{perso}$ of the personalized frame may also be determined depending on the visual correction realized by the ophthalmic lenses.

For this purpose, the criterion of adjustment of personalization is determined depending on the visual correction realized by the ophthalmic lenses.

More precisely, the curvatures of the front face and of the back face of the ophthalmic lens and its thickness may vary greatly.

This may induce particular constraints that may be taken into account in the criteria of adjustment of personalization.

For example, knowing the shape of the rims of the personalized frame and the visual correction associated with the ophthalmic lenses intended to be mounted in the frame, it is possible to determine an optimal face-form angle or an interval of optimal face-form angles of the personalized frame for the accommodation of these ophthalmic lenses.

It is moreover possible to set a minimum distance between the external canthus of the eye of the wearer and the point of the corresponding rim of the personalized frame located at the junction with the corresponding frame temple.

Next the geometric parameter of personalization, for example the face form and/or the length of the frame temples, is determined depending on these two criteria of adjustment of personalization.

Moreover, in the embodiment in which the reference frame 10 is a real frame, a value of said geometric parameter of personalization $P_{perso}$ is determined with the real reference frame 10 positioned on the head TS of the wearer.

The determination of the geometric parameter of personalization $P_{perso}$ then for example includes the following steps (FIG. 7):

a2) determining (block 200 in FIG. 7) the real reference frame 10, this step for example comprising determining the value of at least one reference geometric parameter on said reference frame 10, b2) placing (block 300 in FIG. 7) said reference frame in its position of use on the head of the wearer, c2) in the configuration of step b2), determining (block 400 in FIG. 7) the value of at least one reference geometrico-morphological parameter $PGM_{ref}$ related to the relative position of said reference frame 10 with respect to the head TS of the wearer, d2) from this value of the reference geometrico-morphological parameter $PGM_{ref}$ determined in step c2) and the reference geometric parameter determined in step a2), determining (block 500 in FIG. 7) at least one value of at least one geometric parameter of personalization $P_{perso}$ of said personalized frame.

Step a2)

In step a2), the value of at least one reference geometric parameter of this reference frame is determined.

This reference geometric parameter is especially intended to allow images captured in step c2) to be scaled.

In practice, it is preferably a question of a characteristic length of the reference frame 10, or of a characteristic angle of the reference frame 10. It may especially be a question of the overall diameter of a rim of the reference frame.

This reference geometric parameter has the advantage of being easily determinable in both a front-on and profile captured image.

It may be a question of any other length, for example the length of the first portion of the frame temples 14, 15, the length of the curls 14A, 15A, the separation between the frame temples 14, 15, the angle between the curl 14A, 15A and the first portion of the corresponding frame temple 14, 15 in the plane O1Y1Z1 and in the plane O1X1Z1, the width of the bridge, the shape of the rims, this shape being described by a set of points Pi of coordinates (Xi, Yi, Zi) in the frame of reference (O1X1Y1Z1); in the latter case, knowledge of the points Pi of coordinates (Xi, Yi, Zi) allows by calculation the value of other already mentioned parameters, such as, for example, the bridge length or face-form angle, to be deduced.

The value of this reference geometric parameter is for example determined by a measurement carried out directly on the real reference frame 10. This measurement is for example carried out by the optician.

It may also be predetermined for the reference frame 10 and stored in memory in the computational and electronic means, in correspondence with an identifier of the reference frame.

The step a2) then consists in recovering this datum.

Lastly, this reference geometric parameter of the reference frame 10 may be determined from a captured two- or three-dimensional image of the reference frame 10.

Step b2)

In step b2), said reference frame is placed in its position of use on the head of the wearer.

Since the reference frame 10 is a real frame, it is actually placed in step b2) on the actual head of the wearer.

It is preferably the optician that carries out this step. The step then corresponds to a step of checking the fit of the reference frame. The optician ensures that the positioning is relatively good.

This adjustment is carried out empirically by the optician.

Step c2)

Once the frame has been placed on the head of the wearer, the value of the reference geometrico-morphological parameter $PGM_{ref}$ is determined.

Since the positioning of the reference frame 10 on the head TS of the wearer is here real, the following variants are envisioned.

According to a first variant of this step c2), a measurement is carried out from at least one captured image of the wearer equipped with the reference frame 10.

For this purpose, an image-capturing device such as a video camera or a digital still camera is used.

Next, in step c2) at least one image of the head TS of the wearer equipped with the reference frame 10 is captured. This image capture is preferably carried out by the optician.

It may also be carried out by the wearer, at home, using a webcam for example.

Preferably, the optician captures at least two images of the head of the wearer, viewed at two different angles.

What is meant by that is that the orientation of the head TS of the wearer with respect to the plane of image capture is different in the two captured images.

For example, a front-on first image of the head TS of the wearer and a profile second image of the head TS of the wearer are captured.

Next, from processing of the one or more captured images, the one or more sought reference geometrico-morphological parameters $PGM_{ref}$ are determined.

According to one second variant of step c2), the sought reference geometrico-morphological parameters $PGM_{ref}$ are measured on the head TS of the wearer. In this case, the optician uses conventional measuring tools, for example an opticians ruler, a facial gauge for measurements specific to the nose, a cephalometer for measurements specific to the separation of the temples or to the head, a protractor for any angular measurements.

Whatever the variant envisioned for carrying out this step c2), in practice, as above, the sought reference geometrico-morphological parameters $PGM_{ref}$ depend both on the geometry of the reference frame 10 and the morphology of the head TS of the wearer.

The examples and definitions given as reference in step d1) of the first embodiment of determination of the personalized geometric parameters apply here.

Step d2)

In step d2), at least one value of at least one geometric parameter of personalization $P_{perso}$ of said piece of personalized equipment is determined from the values of the reference geometrico-morphological parameter $PGM_{ref}$ determined in step c2) and from the reference geometric parameter of said reference frame 10 determined in step a2).

The description given of step e1) applies to step d2) of this embodiment.

Whatever the envisioned embodiment, the geometric parameter of personalization determined in step e1) or d2) includes at least one of the following parameters:
  the face-form angle,
  the pantoscopic angle,
  the length of the frame temples,
  the width of the bridge,
  the shape or one of the dimensions of the frame, for example the width or the height of the rims of the personalized frame, or the outline of the ophthalmic lenses in the case of a rimless or half-rimmed personalized frame,
  the positioning or orientation of the elements of the personalized frame that rest on the nose N of the wearer, in particular pads when the personalized frame comprises pads, or sometimes the edge of the personalized frame, in the case of a personalized frame made of plastic and not including pads.

As mentioned above, whatever the embodiment envisioned for the determination of the geometric parameter of personalization $P_{perso}$, since the personalized frame is intended to accommodate corrective ophthalmic lenses, the value of said geometric parameter of personalization $P_{perso}$ of the personalized frame may be determined depending on data relating to the visual correction of the lenses.

In this case, the criterion of adjustment of personalization is determined depending on the visual correction realized by the lenses.

Specifically, in certain cases of use, it is difficult to reconcile the protective properties of the piece of optical equipment, for example the protection provided from the sun or dust, and the prescription of the wearer, i.e. the visual correction realized by the lenses mounted in the frame of this piece of equipment.

Specifically, non-personalized frames providing a satisfactory protection generally have a highly curved front surface.

Therefore, both for technical and aesthetic reasons, the ophthalmic lenses intended to be mounted in such non-personalized frames must have a front face the curvature of which matches the curvature of the frame.

Ophthalmic lenses providing a correction of a visual defect of the myopic type are not very suitable for mounting in this type of frame because they have a front face that is flatter than the shape of the frame.

In order to personalize the whole of the piece of optical equipment of the wearer, it is therefore possible to envision determining the face form of the frame as indicated above.

Determination of the Geometric Definition of the Personalized Frame

To do this, a geometric definition of said personalized frame is then determined depending at least on said determined geometric parameter of personalization $P_{perso}$ and on the reference frame shape chosen by the wearer (600 in FIG. 7).

A plurality of variant embodiments are envisioned for determining the personalized frame.

Whatever the envisioned variant embodiment, this step of determining the personalized frame comprises the following substeps, which will be illustrated below with reference to the various variants:

verifying the feasibility of production of the personalized frame (and of the associated piece of optical equipment), and returning information to a user on the result of the verification.

These steps make it possible to ensure that the personalized frame defined is indeed correct before any step of manufacturing, designing or adjusting the latter.

By virtue of these steps, it is more particularly possible to determine a piece of optical equipment compatible with the feasibility of the frame and/or of the ophthalmic lenses or that allows ophthalmic lenses in conformity with the prescription of the wearer to be accommodated.

Advantageously, it is furthermore checked that the determined personalized frame does not make contact with the head TS of the wearer outside of predefined zones of contact.

Thus, any undesirable zones of interference between the personalized frame and certain portions of the head TS of the wearer are avoided.

Certain wearers are however limited in their choice of frames by the very shape of their head. For example, a wearer having too round a face with protruding cheekbones will not be able to choose a frame the overall vertical dimension of which is too large.

The method according to the invention makes it possible to verify and modify if needs be for example the size of the personalized frame in order to prevent the cheekbones from making contact with the bottom portion of the rims of the personalized frame. In the same way, it is possible to verify and adapt, if needs be, the personalized frame so that the top portion of the rims of the personalized frame does not make contact with the eyebrows of the wearer. A first variant embodiment consists, from a pre-existing initial frame, in deforming said frame so as to obtain the desired personalized frame.

Thus, the determination of the geometric definition of said personalized frame includes the substep in which the geometric definition of the initial frame is deformed so that the geometric definition of the personalized frame, resulting from this deformation, is in conformity with said sought geometric parameter of personalization $P_{perso}$.

Said pre-existing initial frame is ideally the real or virtual reference frame 10 chosen by the wearer.

However, if for example it appears that the reference frame 10 chosen is not adapted to the shape of the head of the wearer or to his visual correction for example, a new initial frame will possibly be selected.

Since this new initial frame will possibly have a different shape and dimensional characteristics and/or be made of a different material from that of the reference frame 10, a prior substep of acquiring a predefined initial geometric definition of this initial frame is provided.

The acquisition of the initial geometric definition of the initial frame for example corresponds to a measurement of a geometric quantity of the real initial frame or to the determination by calculation of such a geometric quantity in the case of a virtual initial frame. For example the face-form angle of the initial frame is determined.

In the step of deforming the initial geometric definition, if the measured or calculated geometric quantity, for example the face-form angle, is not equal, in the definition of the initial frame, to the value of the corresponding geometric parameter of personalization $P_{perso}$, the geometric definition of the initial frame is modified so as to obtain, for the personalized frame, the desired value of this geometric quantity, for example the face-form angle.

These substeps may be carried out virtually, by deforming by calculation the definition of the initial frame so as to obtain a model of the personalized frame, i.e. a virtual personalized frame, or physically, by then directly deforming the initial frame, which then constitutes said geometric definition of the initial frame, so as to obtain a real personalized frame.

In the first case, the one or more deformations of the initial frame required to make the geometric definition of the personalized frame conform with said geometric parameter of personalization $P_{perso}$ are determined.

Once the required deformations of the initial frame have been determined, information is returned on the compatibility between the capacity of the initial frame to deform and the deformation required thereby.

Thus, the computational and electronic means preferably carry out this additional step of returning information on the compatibility between the capacity of the frame to deform and the required deformation of the determined initial frame. The computational and electronic means may be programmed to deduce, from the required deformation of the determined frame, a level of difficulty of the deformation of the initial frame required to obtain the personalized frame. This level of difficulty will be transmitted to the optician who may then advise the wearer to choose another initial frame if the deformation proves to be too difficult.

A warning may also be generated if the deformation is impossible, for example if the required deformation exceeds the mechanical limits of the frame and risks damaging it.

Specifically it is possible to make provision for constraints on these deformations and/or for limiting deformation values not to be exceeded at the risk of damaging the frame, which may depend on the material of the frame.

It is thus possible, in a first variant embodiment, to make provision for the deformations to be carried out without adding material and while remaining within the limits of elastic deformation of the constituent materials of the initial frame.

In this context, the deformations to be applied are deformations that remain in a domain close to the elastic domain of the constituent material of the initial frame.

Moreover, it is very difficult or even impossible to alter in plastic frames the spacing of the zones that rest on the nose, because these zones are directly integrated into the rims of the frame, which do not possess rest elements as flexible as pads.

It is also possible, in a second variant embodiment, to make provision to at least partially define the personalized frame without constraint. This may for example be done using a pre-existing frame, said frame being deformed so as to obtain the desired personalized frame while permitting material to be added, and therefore non-elastic deformations of the material of the initial frame.

The initial frame may thus be deformed without constraint on preservation of at least one of the following dimensions of the initial frame: the perimeter of the rims, the length of the frame temples, the length of the nose bridge of the initial frame.

The definition of a piece of personalized equipment is then at least partially determined, on the basis of the chosen initial frame, depending on personalized geometric parameters $P_{perso}$ that must be obtained, but without limiting the deformations to elastic deformations.

When the feasibility of the personalized frame has been confirmed, the deformations evaluated in the preceding step are physically applied to the initial frame to obtain the personalized frame.

In practice, the following deformations of the initial frame are envisioned in order to respect determined geometric parameters of personalization $P_{perso}$.

To adjust the positioning of the rims in front of the eyes and/or to limit the zones of contact between the rims of the personalized frame and the cheekbones J or the eyebrows SCD, SCG of the wearer, it is possible to modify the separation between the pads of this personalized frame. Since the nose has a trapezoidal shape, the smaller the separation between the pads, the more highly the personalized frame will be positioned on the face of the wearer.

It is also possible to adjust the arms of the pads to move the pads further away or closer to the rims of the personalized frame and thus to modify the distance between the eyes OD, OG and the ophthalmic lenses which will be borne by the personalized frame 10.

To ensure the horizontality of the personalized frame and to adjust the pantoscopic angle, it is possible to modify the inclination of the frame temples with respect to the rims of the personalized frame. This also makes it possible to alter the contact between each frame temple and the trough S of the corresponding ear ORD, ORG of the wearer.

To ensure the horizontality of the personalized frame on the head TS of the wearer with respect to the eyebrows or with respect to the eyes, it is necessary to incline downward the frame temple on the side of the lowest rim or to incline upward the frame temple on the side of the highest rim.

Depending on the height of the ears ORD, ORG with respect to the eyes, it is possible to incline the frame temples toward the bottom of the head of the wearer in order to increase the pantoscopic angle, thereby promoting the near vision of the wearer, or to incline the frame temples in order to decrease the pantoscopic angle, thereby especially allowing contact between the bottom of the rims of the frame and the cheekbones to be limited.

The openness of the frame temples is initially symmetric. However, if the front of the personalized frame, which comprises the rims and bridge, is not parallel to the face of the wearer, it is possible to adjust this parallelism by further opening the frame temple on that side of the front which is furthest from the face of the wearer.

For personalized frames including pads mounted on an arm not integrated into the rims, it is also possible to modify the distance between the contact areas of the pads and the rims of the personalized frame, and the frontal angle and splay angle of each pad.

The modification of the initial frame may also take into account certain limitations or constraints generated by the visual correction of the ophthalmic lenses intended to be mounted in the personalized frame.

For example the thickness of the ophthalmic lens is taken into account.

For example, a highly myopic ophthalmic lens will be produced with a front face of flat base curve. The face-form angle of the personalized frame must then be limited. Reciprocally, for hypermetropic ophthalmic lenses that have a substantial curvature, the face-form angle of the personalized frame may be larger.

When, given the morphology of the wearer, the deformation of the initial frame is free of any constraint, the shape of the piece of optical equipment is defined locally or globally. It is possible to adapt the piece of personalized equipment to the size but also to the features of the face: slope of the nose, shape of the eyebrow, cheekbones, temporal orientation, for example.

The following nonlimiting example relates to the creation or modification of the shape of the outline of the frame (and therefore of the piece of equipment) depending on data of the face of the wearer.

In this example, the reference geometric parameter of step a1) is a set of points Ps of coordinates (Xs, Ys, Zs), which set of points is defined from the frame rim and over an angular sector covering at least the length of the eyebrow of the wearer when the latter is viewed from in front. The top zone of the face and the curves of the eyebrows SCG and SCD are in particular modelled in step b1) then the positioning in c1) is performed.

Then, the reference geometrico-morphological parameter $PGM_{ref}$ used in step d1) consists of a collection Cs of distances between the points Ps of the reference frame 10 and the singular points of the head TS of the wearer.

The points serving in the construction of this collection of distances are chosen by equidistant sampling. The distances forming the collection are then assessed between the points Ps and their respective projections P's on the face. Next, a criterion of adjustment of personalization is used on the collection Cs of distances so that each of the distances of the collection Cs is comprised in a length interval, for example from 1 millimeter to 10 millimeters. The personalized geometric parameter $P_{perso}$ obtained in step e1) is then determined by calculation. It is defined as a set of points P"s, of coordinates (X"s, Y"s, Z"s), for which the criterion of adjustment of personalization is satisfied.

In one exemplary embodiment, the points P"s may be obtained from the points Ps in such a way that the overall shape of the frame is respected.

An additional constraint will possibly be placed on the relationship between the coordinates of the points Ps (Xs, Ys, Zs) and P"s (X"s, Y"s, Z"s), for example such as X"s=f1(Xs) and Y"s=f2(Ys) and Z"s=f3(Zs) where f1, f2 and f3 are three predetermined functions. In this case, the piece of personalized equipment is produced by modifying the coordinates of the points along the axis O1Z1.

In another exemplary embodiment, the overall shape of the frame may be modified. In this context, the relationship between the points Ps and P"s includes a constraint of the type X"s=k*Xs and Y"s=Ys and Z"s=f(Zs), where f is a predetermined function of Zs. The piece of personalized equipment is then produced by modifying the size of the rims of the frame along the axis O1X1.

In the case where the shape of the frame may be modified locally, the relationship between the points Ps and P"s includes a constraint derived from the curve of the eyebrows SCG (SCD, respectively). The piece of personalized equipment is thus produced by modifying the shape of the rims of the frame so as to transpose on the right rim the shape of the curve SCG. The constraint is then defined pointwise between the points Ps and the points of the eyebrow of the wearer in a limited angular sector.

Other curves derived from the median zone of the face will possibly serve in the same way to modify the shape of the outline.

According to the principle described above, it is possible to define other geometric parameters dependent on the vertical and horizontal meridians of the face rather than on the eyebrows to for example define the curvatures of the frame and/or of the ophthalmic lens. Implicitly, parameters of the frame such as the face-form or wrap angle and/or the pantoscopic angle are thus defined depending on these features of the face of the wearer.

The following nonlimiting example relates to the determination of the personalized geometric parameter $P_{perso}$ of bridge length Lp.

In this case, the reference geometric parameter of step a1) is the length Lp of the bridge. This length is for example determined by the shortest distance between the points Ps(g) and Ps(d) derived from the respective left and right frame shapes. The determined reference geometrico-morphological parameter $PGM_{ref}$ is the zone of contact on the nose of the wearer. The criterion of adjustment of personalization is the correct position of the pads 16A.

The new value of the personalized length of the bridge is established from points P"s(g) and P"s(d) of the personalized rims such that P"s(g)=f(Ps(g)) and X"s(g)=Xs(g)+kxg where kxg, defined as a constant, is calculated to satisfy the left-hand criterion of adjustment and P"s(d)=f(Ps(d)) and X"s(d)=Xs(d)+kxd for the right-hand side. The personalized length of the bridge is defined by the following relationship:

$$Lp"=Lp+kxg+kxd.$$

There are many possible ways of deforming the initial frame. Each may be applied alone or in combination with one of the aforementioned examples.

This type of determination is advantageously used when it is a question of drilled frames, the frame-shape characteristics are then easy to implement directly on the ophthalmic lenses during edging.

Optionally in this case, the geometrico-morphological parameter is used to define the curvature of the front face of the lenses.

Moreover, provision may be made to apply a constraint ensuring that the overall shape of the frame is preserved, in order that the wearer recognizes the chosen initial frame in the obtained personalized frame. This constraint may for example be expressed by intervals of values permitted for the various possible deformations of the initial frame. It is possible for example to make provision for the diameter of the rims not to be modified by more than 10%, for the length of the frame temples or the total width of the front of the frame not to be enlarged or shrunk by more than 10%, for, when the rim is described in the boxing system, the ratio of the horizontal and vertical sides associated with the rectangle circumscribed on the shape not to be modified by more than 10%, etc.

The definition obtained of the personalized frame is then a virtual definition taking the form of a model of the personalized frame.

Next, at least one portion of the personalized frame is manufactured in conformity with this definition by molding or by machining in the case of a personalized frame made of plastic, by digitally controlled shaping in the case of a personalized frame made of metal or by any other manufacturing means known to those skilled in the art.

The personalized frame may be at least partially produced by additive rapid prototyping.

In a second variant embodiment of the step of determining the personalized frame, the determination of the geometric definition of said personalized frame includes accessing a register of predefined frames containing, associated with each predefined frame, an identifier of the shape of the predefined frame and at least one geometric parameter of this predefined frame and searching in this register for at least one predefined frame the shape of which corresponds to the shape of initial frame chosen by the wearer and the geometry of which satisfies, with a predefined margin of tolerance, the geometric parameter of said personalized frame.

This definition of the personalized frame is then also a virtual definition taking the form of a model of the personalized frame.

The computational and electronic means preferably carry out an additional step of returning information on the compatibility between the geometry of the selected predefined frame and that of the determined initial frame.

This return is transmitted to a predetermined person such as for example the optician who may then advise the wearer to choose another initial frame if no frame is satisfactory to within the predefined margin of tolerance.

A warning may also be emitted if the selection of a frame is impossible.

When the feasibility of the personalized frame is confirmed, the definitive choice of the personalized frame is made. The personalized frame may then be ordered or manufactured by any means known to those skilled in the art, as explained below.

Lastly, in a third variant embodiment of the step of determining the personalized frame, the determination of the geometric definition of the personalized frame includes assembling geometric definitions of constituent portions of the frame comprising at least one nose-rest element.

It is also possible to determine in this variant the piece of personalized equipment by assembling stock lenses and constituent portions of the personalized frame.

Complementary geometric definitions of the frame comprise the frame temples and the rims of this frame.

Each of these portions is respectively selected by a search, in a register containing various production shapes and/or dimensions of the portion in question, for at least one shape and/or dimension of this portion corresponding to the shape of frame chosen by the wearer and the geometry of which satisfies, with a predefined margin of tolerance, the geometric parameter of personalization $P_{perso}$.

This definition of the personalized frame and of the associated piece of equipment is then also a virtual definition taking the form of a model of the personalized frame.

According to this third possibility, constituent parts of the personalized frame are chosen or selected. The physical assembly of these parts results in the manufacture of the personalized frame.

For this purpose, from a set of predefined parts, those allowing the personalized frame to be constructed are selected.

Each of these constituent parts is available in stock for a limited number of sizes. It may be a question of frame temples of various lengths. It may also be a question of frame front faces of more or less rounded or more or less curved shape.

The computational and electronic means preferably carry out an additional step of returning information on the compatibility between the selected assembly and the determined initial frame.

This return is transmitted to a user such as for example the optician who may then advise the wearer to choose another initial frame if no assembly is satisfactory to within the predefined margin of tolerance.

A warning may also be emitted if the selection of an assembly is impossible.

When the feasibility of the personalized frame is confirmed, the assembly is selected and the physical assembly is carried out.

Whatever the way implemented to determine the geometric definition of the personalized frame, after the geometric definition of said personalized frame has been determined, this geometric definition is transmitted to the wearer for validation by him or to the optician for mounting-inspection purposes.

By way of example, it is possible to imagine returning a representation of the frame in the form of a chart featuring certain parameters of the frame, such as the face-form angle, the pantoscopic angle, the mounting height, etc.

It is also possible to envision returning a model of the personalized frame allowing the wearer to carry out a virtual check of the fit of the piece of personalized optical equipment. During this virtual check of fit, the model of the personalized frame is superposed on the model of the head TS of the wearer and a graphical representation of this superposition is displayed for the wearer.

After the geometric definition of said personalized frame has been determined, a geometrico-morphological parameter related to the relative position of said personalized frame with respect to the head of the wearer is preferably deduced therefrom and information is returned on whether the personalized frame obtained by this geometric definition is in conformity with the criterion of adjustment of personalization.

In practice, for this purpose, the computational and electronic means may simulate the positioning of the obtained personalized frame on the head of the wearer and carry out an additional step of returning information indicating a final provided relative position for the personalized frame on the head of the wearer.

Advantageously, the superposition of the model of the personalized frame on the head TS of the wearer allows the optimal position of the piece of personalized optical equipment on the head TS of the wearer to be determined. The determined wear parameters will possibly be used in the optical conception of the ophthalmic lenses, in place of wear parameters measured on the wearer.

The optimization during the optical conception of the lenses is then more precise.

Whatever the envisioned variant embodiment, it is thus possible to make provision for information to be returned on the feasibility of the manufacture of the personalized frame, for example after the geometric definition of said personalized frame has been determined.

Specifically it is possible to verify the compatibility of the geometry of the obtained personalized frame with manufacturing information: for example, the characteristics of the personalized frame are compared with the minimum and maximum values of the width of the bridge, and/or of the face-form angle, and/or of the pantoscopic angle, and/or of the frame-temple length, and/or of the curvature of the ophthalmic lenses.

If certain characteristics of the personalized frame do not lie within the ranges of possible maximum and minimum values for the manufacture of the personalized frame, it is possible to correct the personalized frame by substituting for these characteristics the closest permitted values.

A new definition of the personalized frame is then determined and the geometrico-morphological parameters associated with this new definition may then be determined in order to verify that the criteria of personalized adjustment are respected. If this is not the case, it is possible to return a warning to the user. In the case where the geometric definition of the personalized frame is real, it is possible to carry out a real check of fit and to take measurements such as those described in the embodiment of step d2) for the reference frame in order to verify that the personalized criteria of adjustment are indeed respected.

These various items of information are transmitted to the operator and may help in making the decision regarding the choice of spectacle frame.

Generally, whatever the considered embodiment, the data relating to at least one morphological quantity of the head TS of the wearer is acquired at a first site and the value of said at least one geometric parameter of personalization of the frame is determined at a second site distinct from the first.

The first site is preferably located in any place accessible either physically by the wearer, or on a server, whereas the second site is located at an opticians, an optical laboratory, or an online supplier of optical equipment.

The personalized frame is manufactured at a third site, distinct from the first site, which is either distinct from or the same as the second site.

The determination of the definition of the personalized frame and the manufacture of the personalized frame takes place at a third site, distinct from the first site, which is either distinct from or the same as the second site.

Provision is made to transmit data relating to at least one morphological quantity of the head TS of the wearer from the first site to the second site, to transmit the value of said at least one geometric parameter of personalization $P_{perso}$ of the personalized frame from the second site to the third site and to return, from the third site, the definition of the personalized frame and/or of the personalized frame from the third site to the first.

In practice, at least the morphological and refraction data of the wearer are sent from the first site, located in the shop of the optician or the home of the wearer, to the second site.

The second site is a remote, specialized calculation site that performs the calculation of the piece of personalized equipment.

The geometric data on the initial frame may either be transmitted from the first to the second site, or collected by the second site from a local or remote database.

The definition of the piece of personalized equipment calculated at the second site is preferably returned to the first site in order that the optician and/or the wearer can validate this piece of equipment, especially after a virtual check of fit.

Optionally, a message indicating that personalization is impossible may be returned to the first site.

After validation, the second or third site transmits the definition of the piece of personalized equipment to the manufacturing third site.

The second site may also directly transmit the definition of the piece of personalized equipment to the third site for manufacturing this piece of personalized equipment.

The invention claimed is:

1. A method for determining a geometric definition of a piece of personalized optical equipment adapted to a wearer, comprising at least one geometric definition of a personalized frame of this piece of personalized equipment, wherein
a reference frame chosen by the wearer is identified,
a value of at least one geometric parameter of personalization ($P_{perso}$) of the frame is determined on a basis of an acquisition of data relating to at least one morphological quantity of head (TS) of the wearer, in such a way that the personalized frame is adjusted to conform with a least one criterion of adjustment of personalization of a geometry of the personalized frame with respect to the at least one morphological quantity of the head (TS) of the wearer, said criterion of adjustment of personalization comprising a constraint on at least one geometrico-morphological parameters related to the relative position of said personalized frame with respect to the head of the wearer,
the geometric definition of said personalized frame is determined depending on said at least on geometric parameter of personalization of the frame and on the reference frame chosen by the wearer.

2. The method as claimed in claim 1, wherein the geometric definition of said piece of personalized optical equipment furthermore includes a geometric definition of personalized ophthalmic lenses intended to be mounted in said personalized frame, the geometric definition of the ophthalmic lenses being determined depending on the geometric definition of the personalized frame.

3. The method as claimed in claim 1, wherein the frame being intended to accommodate visual correction lenses, the value of said geometric parameter of personalization of the personalized frame is determined depending on a visual correction realized by the visual correction lenses.

4. The method as claimed in claim 1, wherein said geometrico-morphological parameter related to the relative position of said personalized frame with respect to the head of the wearer comprises one of the following parameters:
a relative position of frame temples of the personalized frame with respect to ears (ORD, ORG) of the wearer,
a spacing of the frame temples of the personalized frame, said spacing being defined depending on a determined separation between the ears (ORD, ORG),
an evaluation of an area of contact between nose-rest elements of the personalized frame and nose (N) of the wearer,
a relative position of rims of the personalized frame and eyes (OD, OG) of the wearer,
a relative position of lenses mounted in the personalized frame and the eyes (OD, OG) of the wearer,
a distance between at least one singular point of the rims of the personalized frame and at least one singular point of the head of the wearer,
a distance between at least one singular point of an outline of the lenses mounted in the personalized frame and a singular point of the head of the wearer,
a geometry of the outline, said geometry is defined depending on an eyebrow (SCD, SCG), superciliary-arch (SC) or cheekbone (JS) geometry of the wearer,
an angle between a straight line connecting salient points of the cheekbone (JS) and of a superciliary arch (SCS) and a mean plane (PMC) of a rim of the personalized frame placed facing, measured in a plane perpendicular to said mean plane of the rim of the frame, and
an angle between a straight line connecting a sphenoid point (P1) and a point (PN) of a side of the nose of the wearer and the mean plane (PMC) of a corresponding rim of the frame, measured in a plane parallel to a Frankfurt plane (PF) of the head (TS) of the wearer.

5. The method as claimed in claim 1, wherein the geometric definition of said personalized frame includes accessing a register of frames containing, associated with each frame, an identifier of a shape of the frame and at least one geometric parameter of this frame and searching in this register for at least one frame a shape of which corresponds to a shape of frame chosen by the wearer and the geometry of which satisfies, with a predefined margin of tolerance, the geometric parameter of personalization ($P_{perso}$) of said personalized frame.

6. The method as claimed in claim 1, wherein, to determine the geometric definition of said personalized frame:
a geometric definition of an initial frame is deformed so that the geometric definition of the personalized frame resulting from this deformation conforms with said geometric parameter of personalization ($P_{perso}$), with an adjustment on the head (TS) of the wearer in conformity with said criterion of adjustment of personalization.

7. The method as claimed in claim 6, wherein the deformation of the initial frame required for the geometric definition of the personalized frame to conform with said geometric parameter of personalization ($P_{perso}$) is determined and information is returned on a compatibility between an ability of the initial frame to be deformed and the deformation required thereby.

8. The method as claimed in claim 6, wherein the initial frame is deformed without constraint on preservation of at least one of a perimeter of rims of the initial frame, a length of frame temples, a length of a nose bridge of the initial frame, and an initial frame outline curvature, wherein each foregoing dimension is an dimension of the initial frame.

9. The method as claimed in claim 1, wherein, after a geometric definition of said personalized frame has been determined, this geometric definition is transmitted to the wearer for validation thereby.

10. The method as claimed in claim 1, wherein, after a geometric definition of said personalized frame has been determined, a geometrico-morphological parameter related to a relative position of said personalized frame with respect to the head (TS) of the wearer is deduced therefrom and information is returned on whether the personalized frame obtained by this geometric definition is in conformity with the criterion of adjustment of personalization.

11. The method as claimed in claim 1, wherein information is returned on a feasibility of manufacture of the personalized frame or the piece of personalized equipment.

12. The method as claimed in claim 1, wherein the determination of the geometric definition of the piece of personalized equipment includes assembling geometric definitions of portions of the frame such as frame temples, nose-rest elements and rims, each of these portions respectively being selected by a search, in a register containing various production dimensions and/or shapes of the portion in question, for at least one shape and/or dimension of this portion corresponding to a shape of frame chosen by the wearer and the geometry of which satisfies, with a predefined margin of tolerance, the geometric parameter of personalization ($P_{perso}$).

13. The method as claimed in claim 1, wherein the data relating to at least one morphological quantity of the head (TS) of the wearer is acquired at a first site and the value of said at least one geometric parameter of personalization of the frame is determined at a second site distinct from the first.

14. The method as claimed in claim 13, wherein the first site is located in any place accessible either physically by the wearer, or on a server, whereas the second site is located at an opticians, an optical laboratory, or an online supplier of optical equipment.

15. The method as claimed in claim 13, wherein manufacture of the personalized frame takes place at a third site, distinct from the first site, which is either distinct from or same as the second site.

16. The method as claimed in claim 15, wherein provision is made to transmit data relating to at least said morphological quantity of the head (TS) of the wearer and an identifier of the reference frame from the first site to the second site, to transmit the value of said at least one geometric parameter of personalization ($P_{perso}$) of the personalized frame from the second site to the third site and to return, from the third site, at least one of a definition of the personalized frame and of the personalized frame, from the third site to the first site.

\* \* \* \* \*

UNITED STATES PATENT AND TRADEMARK OFFICE
CERTIFICATE OF CORRECTION

PATENT NO. : 10,108,028 B2
APPLICATION NO. : 15/109549
DATED : October 23, 2018
INVENTOR(S) : Carlos Rego et al.

Page 1 of 1

It is certified that error appears in the above-identified patent and that said Letters Patent is hereby corrected as shown below:

On the Title Page

Item (72), the 6th inventor's name is incorrect. Item (72) should read:
-- (72) Inventors: Carlos Rego, Charenton-le-Pont (FR); Bruno Amir, Charenton-le-Pont (FR); Guillaume Broutin, Charenton-le-Pont (FR); Maxime Boiffier, Charenton-le-Pont (FR); Thierry Bonnin, Charenton-le-Pont (FR); Melanie Tessieres, Charenton-le-Pont (FR); Jerome Moine, Charenton-le-Pont (FR) --

Signed and Sealed this
Twenty-eighth Day of May, 2019

Andrei Iancu
*Director of the United States Patent and Trademark Office*